Nov. 26, 1940.  J. FRUNS  2,222,900
LOCKING DEVICE FOR MOTOR VEHICLES
Filed Nov. 22, 1939  2 Sheets-Sheet 1
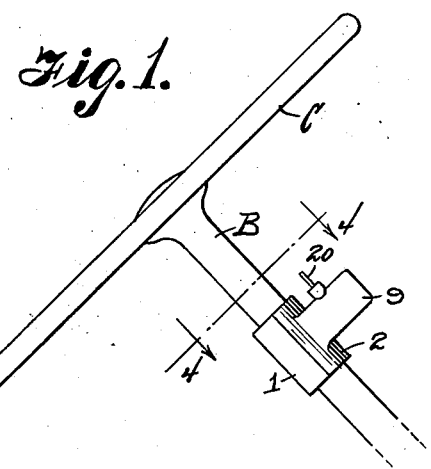
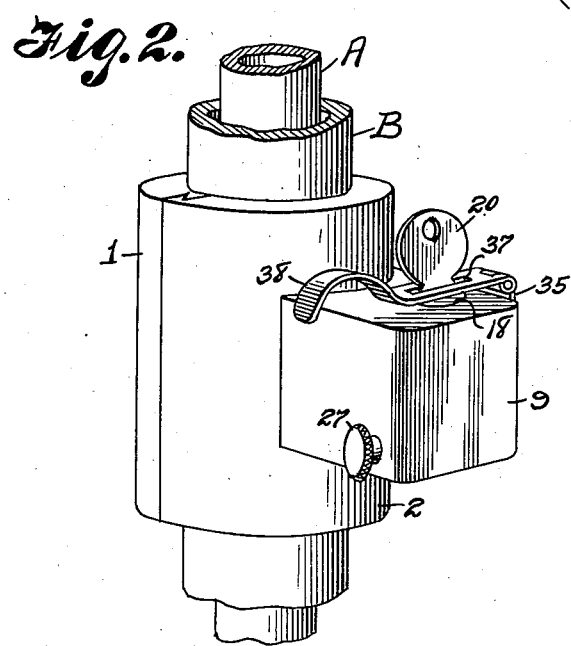
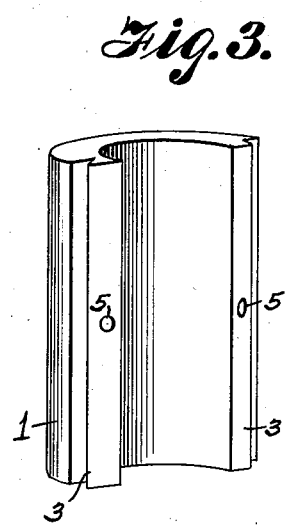
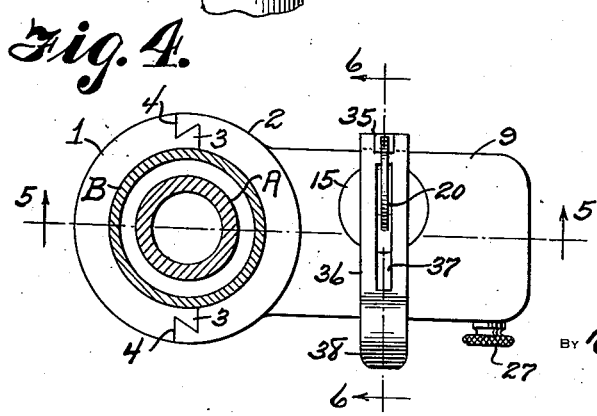
Jose Fruns
INVENTOR
BY Victor J. Evans & Co.
ATTORNEYS Nov. 26, 1940. J. FRUNS 2,222,900
LOCKING DEVICE FOR MOTOR VEHICLES
Filed Nov. 22, 1939 2 Sheets-Sheet 2
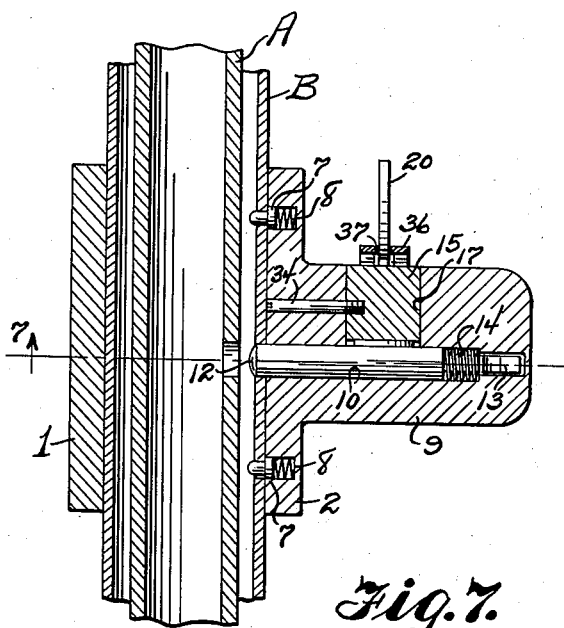
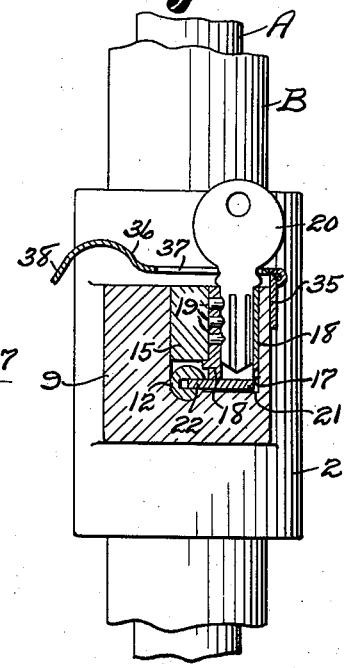
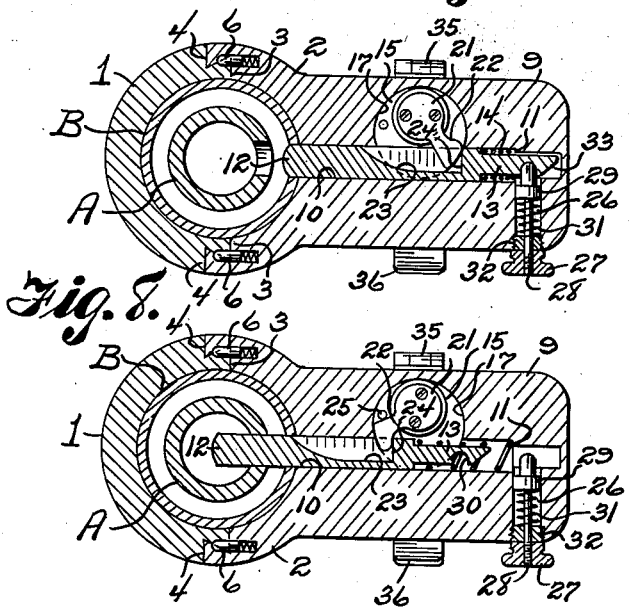
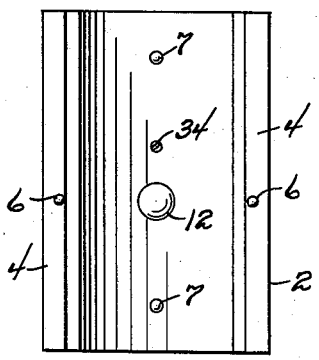
Jose Fruns
INVENTOR
BY Victor J. Evans & Co.
ATTORNEYS Patented Nov. 26, 1940

2,222,900

UNITED STATES PATENT OFFICE 2,222,900

LOCKING DEVICE FOR MOTOR VEHICLES

José Fruns, Mexico, D. F., Mexico

Application November 22, 1939, Serial No. 305,740

1 Claim. (Cl. 70—186)

This invention relates to locks for motor vehicles, and its general object is to provide a device for locking the steering shaft of a vehicle against movement, so that the vehicle cannot be controlled, thus hindering the theft thereof.

A further object is to provide a steering shaft locking device that can be applied to the column or housing of the shaft in an easy and expeditious manner, but removal or displacement therewith respect to the shaft is impossible, without materially damaging the steering apparatus and the device especially when the latter is in locked position.

Another object is to provide a steering shaft key actuated locking device that can be moved to locked position without the use of the key, but of course the key is necessary to unlock the same, and the locking means is fixed with respect to the device in a manner to prevent any possibility of removal thereof.

A still further object is to provide a steering shaft key actuated locking device that includes a guard to hold the key within the lock, to prevent casual removal thereof.

A still further object is to provide a locking device of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a side elevation illustrating my locking device applied to the housing of the steering shaft of a motor vehicle.

Figure 2 is a fragmentary enlarged perspective view of the device applied to the housing.

Figure 3 is a perspective view of one of the sections of the attaching sleeve.

Figure 4 is a sectional view taken approximately on line 4—4 of Figure 1, looking in the direction of the arrows.

Figure 5 is a sectional view taken approximately on line 5—5 of Figure 4, looking in the direction of the arrows.

Figure 6 is a sectional view taken approximately on line 6—6 of Figure 4, looking in the direction of the arrows.

Fig. 7 is a sectional view taken approximately on line 7—7 of Figure 5, looking in the direction of the arrows.

Figure 8 is a sectional view similar to that of Figure 7, but illustrates the device in locked position.

Figure 9 is a view of the body section of the attaching sleeve and looking toward the inner face thereof.

Referring to the drawings in detail, the letter A indicates the steering shaft, B the column or housing, and C the steering wheel that is fixed to the shaft in the usual manner, as will be apparent. The housing B as well as the shaft A are each provided with holes, arranged for disposal in registration with each other when it is desired to lock the shaft against movement, as will be obvious upon inspection of Figure 8.

It will be noted that my device includes an attaching sleeve that surrounds and fits the housing B and is made up of a pair of sections 1 and 2, each providing a longitudinal half of the sleeve in the form shown. The longitudinal or confronting edges of the sections are grooved along the length thereof to provide inclined hook like shoulders 3 and 4 arranged in a manner so that the shoulders of one section will overlap the shoulders of the other section when the sleeve is applied to the housing, thus preventing radial movement of the sections from the housing, as will be obvious upon inspection of Figure 4.

In order to prevent longitudinal movement of the sections relative to each other, the section 1 has keeper sockets 5 in the shoulders 3 thereof, and the section 2 has spring pressed pins 6 mounted for slidable movement therein and extending through its shoulders to be received in the sockets 5, as best shown in Figures 7 and 8.

The section 2 provides the body for the device, and has headed spring pressed pins 7 mounted for slidable movement therein for disposal in holes 8 in the housing, to prevent rotation and longitudinal movement of the device on the housing, as will be apparent upon inspection of Figure 5, consequently it will be seen that the sections are held against relative movement in any direction and the device in its entirety is fixed to the housing in a manner to prevent any possibility of casual removal or displacement thereof.

The body section 2 has formed therewith and extending at right angles therefrom preferably midway between its ends and sides, a blocklike lock casing 9, of rectangular formation, as best shown in Figure 5. The casing is provided with a bore 10 extending longitudinally thereof and through the section 2, but terminates short of the outer end of the casing, and the closed end portion of the bore is reduced to provide a shoulder 11. The bore 10 registers with the bolt receiving opening in the housing B and mounted for slidable movement in the bore is a bolt 12 disposed at all times within its opening in the housing, to cooperate with the pins 7 to prevent rotation or longitudinal movement of the device on the housing.

The bolt 12 is provided with a reduced inner portion 13 to fit within the reduced portion of the bore 10, as shown in Figure 7, and the portion 13 likewise provides a shoulder between which and the shoulder 11 is mounted a coil spring 14 sleeved on the reduced portion 13 for urging the bolt in normally locked position, as shown in Figure 8, which illustrates that the bolt extends into and passes through the hole of the shaft A to prevent movement of the latter, so that the vehicle cannot be controlled, thus hindering the theft thereof.

The bolt 12 is moved to unlocked position against the action of the spring 14 by key actuated locking means of the tumbler type, in the form as shown. The key actuated means includes a barrel housing 15 fitting and fixed within a chamber 17 in the casing 9 and extending through the upper face thereof as well as communicating with the bore 10. The upper end of the housing 15 is flush with the upper face of the casing and the housing 15 has rotatably mounted therein a lock cylinder 18 that is locked against movement by tumblers 19, the tumblers being actuated by a key 20 to allow rotation of the cylinder 18, as will be apparent.

Fixed to the lower end of the cylinder 18 by screws or the like is a disk portion 21 of the bolt actuating member that includes a lug 22 extending from the periphery of the disk portion for disposal within a groove 23 disposed longitudinally of the bolt, as clearly shown in Figures 7 and 8, the groove having a rounded end portion, while its opposite end is straight to provide a shoulder 24 to be engaged by the hooklike end of the lug for moving the bolt against the action of its spring to unlocked position, as shown in Figure 7. The cylinder 18 is shown as being mounted eccentrically with respect to the housing 15, for engagement of the lug with the wall of the chamber to limit movement of the cylinder to retain the lug within the groove 23, and I likewise provide a pin 25 for that purpose, which is disposed in the path of the flat side of the lug, as will be noted upon inspection of Figures 7 and 8.

While it is necessary to use the key 20 to move the bolt to its unlocked position of Figure 7, the bolt is normally urged to its locked position of Figure 8, but in order to hold it in its unlocked position, I provide a spring pressed latching member mounted for slidable movement in a bore 26 disposed transversely of the casing 9 and communicates with the reduced portion of the bore 10. The latching member includes a knob 27 having threaded thereto a shank 28 extending into the bore 26 and having secured to its inner end a headed member 29 having a rounded inner end to be received within a notch 30 disposed laterally in the reduced inner portion 13 of the bolt for holding the bolt in released or unlocked position, as shown in Figure 7. The latching member is spring pressed by a spring 31 sleeved on the shank 28 and having its end convolutions engaging the head of the member 29 and a plug 32 threaded in the bore 26 for closing the outer end thereof and acting as a stop for the knob 27, to limit the inward movement of the latching member. The free end of the reduced portion 13 is provided with a cammed face 33 for engagement with the rounded end of the headed member 29, so that when the bolt is moved to its unlocked position, the cammed face will ride on the rounded inner end of the member 29 for disposing the inner end into the notch, as will be apparent upon inspection of Figures 7 and 8.

The barrel housing 15 is not only fixed within the casing 9 but is fixed in a manner whereby access cannot be had to the securing means which as best shown in Figure 5 is a headless bolt 34 for disposal through a bore extending between the chamber for the housing 15, and the inner face of the body section, and the bolt is threaded in the housing 15 prior to applying the device to the housing B as will be apparent upon inspection of Figure 5.

I preferably provide means to prevent casual turning of the key, as well as removal thereof from the cylinder, when in unlocked position, and for that purpose the casing 9 has a bracket 35 secured to one side face thereof and the bracket has hinged thereto a flat lever arm 36 provided with a slot 37 extending longitudinally thereof and of a size for passage about the head of the key, but of a width for disposal in wiping engagement with the flat sides of the head to contact the sides of the shank at its juncture with the head, as best shown in Figure 2. The lever arm is provided with a curved free end portion providing a handle 38 to facilitate moving the same into and out of use.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A locking device for the housed steering shaft of a motor vehicle, comprising attaching means to be fixed to the housing of the shaft, locking means including a casing having a chamber therein and formed on the attaching means, said shaft and housing having holes therein and disposed for registration with each other, a bolt slidably mounted in the casing for disposal in the hole of the housing and receivable in the hole of the shaft to lock the latter against movement, a spring for normally urging and holding the bolt in locked position, manually releasable means for holding the bolt in unlocked position, said bolt having a groove provided with an abutment shoulder and extending longitudinally therein, a barrel housing fitting and fixed within the chamber, a lock cylinder rotatably mounted within the barrel housing, a disk fixed to the inner end of the cylinder, a substantially hook-shaped lug formed on and extending from the periphery of the disk for disposal in the groove of the bolt to hold the cylinder within the barrel housing and for engagement with the shoulder for moving the bolt to unlocked position, a pin arranged in the path of the lug, and said cylinder being eccentrically arranged with respect to the barrel housing for the engagement of the lug with the wall of the chamber to cooperate with the pin to limit rotation of the cylinder for retaining the lug within the groove.

JOSÉ FRUNS.